United States Patent
Hasberg et al.

(10) Patent No.: US 9,738,278 B2
(45) Date of Patent: Aug. 22, 2017

(54) CREATION OF AN OBSTACLE MAP

(71) Applicant: Robert Bosch GmbH, Stuttgart (DE)

(72) Inventors: Carsten Hasberg, Ilsfeld-Auenstein (DE); Karsten Muehlmann, Stuttgart (DE); Oliver Pink, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 4 days.

(21) Appl. No.: 14/759,826

(22) PCT Filed: Nov. 21, 2013

(86) PCT No.: PCT/EP2013/074331
§ 371 (c)(1),
(2) Date: Jul. 8, 2015

(87) PCT Pub. No.: WO2014/108233
PCT Pub. Date: Jul. 17, 2014

(65) Prior Publication Data
US 2015/0353083 A1    Dec. 10, 2015

(30) Foreign Application Priority Data

Jan. 14, 2013    (DE) .................. 10 2013 200 387

(51) Int. Cl.
*B60W 30/09* (2012.01)
*G06T 3/40* (2006.01)
(Continued)

(52) U.S. Cl.
CPC ........... *B60W 30/09* (2013.01); *G05D 1/0274* (2013.01); *G06K 9/00805* (2013.01);
(Continued)

(58) Field of Classification Search
CPC .............. G06K 9/00805; B60W 30/09; B60W 2420/52; B60W 2420/42; B60W 2550/10;
(Continued)

(56) References Cited

U.S. PATENT DOCUMENTS 5,343,206 A    8/1994  Ansaldi et al.
5,410,346 A *  4/1995  Saneyoshi ................. B60R 1/00
                                                    348/116
(Continued)

FOREIGN PATENT DOCUMENTS

DE    102011078615 A1    1/2013

OTHER PUBLICATIONS

Rasterize _ Define Rasterize at Dictionary.pdf (Rasterize | Define Rasterize at Dictionary.com, Oct. 6, 2016, http://www.dictionary.com/browse/rasterize, pp. 1-2).*

(Continued)

*Primary Examiner* — Bao Long T Nguyen
(74) *Attorney, Agent, or Firm* — Norton Rose Fulbright US LLP; Gerard Messina

(57) ABSTRACT

A method for creating an obstacle map of an area surrounding a motor vehicle on a road includes preparing a rasterized obstacle map, scanning an area surrounding the motor vehicle, dividing the surrounding into cells, recording those of the cells that are occupied by an obstacle, and identifying grid points of the obstacle map that correspond to occupied cells in the surrounding area. The dimensions of the cells are determined as a function of the position thereof relative to the course of the road.

8 Claims, 4 Drawing Sheets

(51) Int. Cl.
 *G06T 11/20* (2006.01)
 *G06K 9/00* (2006.01)
 *G05D 1/02* (2006.01)
 *G08G 1/16* (2006.01)

(52) U.S. Cl.
 CPC .......... *G06T 3/4007* (2013.01); *G06T 11/203* (2013.01); *B60W 2420/42* (2013.01); *B60W 2420/52* (2013.01); *B60W 2550/10* (2013.01); *G06T 2210/21* (2013.01); *G06T 2210/61* (2013.01); *G08G 1/16* (2013.01)

(58) Field of Classification Search
 CPC .......... B60W 30/095; B60W 30/0956; B60W 40/072; B60W 2550/143; B60W 2550/146; B60W 2550/30; B60W 2550/306; B60W 3/4007; G06T 11/203; G06T 2210/21; G06T 2210/61; G05D 1/0274; G08G 1/16; B60G 2400/823
 USPC .... 701/1, 409, 455, 519, 300, 301; 345/667, 345/671; 340/435, 436, 995.15
 See application file for complete search history.

(56) References Cited

U.S. PATENT DOCUMENTS

| | | | | |
|---|---|---|---|---|
| 8,600,654 B2* | 12/2013 | Kishikawa | ......... | G01C 21/3632 340/995.1 |
| 8,930,060 B1* | 1/2015 | Lu | ........................ | G05D 1/0214 340/438 |
| 2004/0105090 A1* | 6/2004 | Schultz | ................... | G01C 11/02 356/141.5 |
| 2007/0005306 A1* | 1/2007 | Foessel | ................. | G01S 13/723 702/189 |
| 2007/0219720 A1* | 9/2007 | Trepagnier | ............ | B60W 30/00 701/300 |
| 2008/0055192 A1* | 3/2008 | Nagano | ................. | G02B 27/01 345/7 |
| 2009/0237269 A1* | 9/2009 | Okugi | ....................... | B60R 1/00 340/901 |
| 2010/0082307 A1* | 4/2010 | Dorum | .................... | G01C 21/30 703/2 |
| 2010/0104137 A1* | 4/2010 | Zhang | ................ | G06K 9/00805 382/104 |
| 2010/0324752 A1* | 12/2010 | Suganuma | ............ | B60W 40/06 701/1 |
| 2011/0202247 A1* | 8/2011 | Takeoka | ................ | G05D 1/024 701/70 |
| 2011/0228980 A1 | 9/2011 | Ichikawa et al. | | |
| 2012/0053755 A1* | 3/2012 | Takagi | ................. | B60W 40/04 701/1 |
| 2013/0307981 A1* | 11/2013 | Jang | ........................ | H04N 7/18 348/148 |
| 2015/0284010 A1* | 10/2015 | Beardsley | ............ | B60W 50/10 701/41 |

OTHER PUBLICATIONS

Gindele. T. et al., "Bayesian occupancy grid filter for dynamic environments using prior map knowledge", Intelligent Vehicles Symposium, 2009 IEEE, IEEE, Piscataway, NJ, USA, Jun. 3, 2009, Seiten 669-676 XP031489920.
International Search Report for PCT/EP2013/074331, dated Jan. 15, 2014.

* cited by examiner

CREATION OF AN OBSTACLE MAP

FIELD OF THE INVENTION

The present invention relates to a motor vehicle including an assistance function or an autonomous control. In particular, the present invention relates to the creation of an obstacle map of an area surrounding the motor vehicle.

BACKGROUND

To make an automated or partially automated control of a motor vehicle possible, sensors are customarily used to scan an area surrounding the motor vehicle to determine the location of obstacles with which the motor vehicle should not collide. For that purpose, the surrounding area is usually theoretically subdivided into a regular grid, and, for each cell of the grid, whether an obstacle is located therein is determined The thus acquired information is transferred to an obstacle map that includes a number of grid points whose placement corresponds to that of the cells of the area surrounding the motor vehicle. A grid point is identified that corresponds to a cell that is occupied to more than a predefined degree.

On the basis of the obstacle map, how the motor vehicle is to be controlled to avoid a collision with one of the obstacles can subsequently be determined To that end, in particular, which cells will be occupied at a future point in time can be determined This also makes it possible to avoid a collision with any arbitrary object.

A technology of this kind is described, for example, in T. Gindele et al., "Bayesian Occupancy Grid Filter for Dynamic Environments Using Prior Map Knowledge," IEEE Intelligent Vehicles Symposium, pp. 669-676, China (2009).

SUMMARY

Classic obstacle maps of the aforementioned type must be finely rasterized in order to permit an accurate enough control of the motor vehicle. As a result, the complexity of the processing of the obstacle map can quickly take on levels of magnitude that are difficult to realize in a real-time system. For example, if the obstacle map encompasses a matrix of 100×100 grid points, it is then composed of 10,000 binary grid points that correspond to a number of $2^{10,000}$ possible obstacle maps. Thus, the above indicated time prediction of a future obstacle map on the basis of an existing obstacle map can become a virtually unsolvable problem.

It is an object of the present invention to provide a technical method that will make creating an improved obstacle map possible. Another object of the present invention is to specify an improved control of a motor vehicle on the basis of an obstacle map. This objective is achieved in accordance with an example embodiment of the present invention by a computer program product method and by a device.

According to an example embodiment of the present invention, a method for creating an obstacle map of an area surrounding a motor vehicle on a road includes the steps of preparing a rasterized obstacle map; scanning an area surrounding the motor vehicle, the surrounding area being subdivided into cells; recording cells that are occupied by an obstacle; and identifying grid points of the obstacle map that correspond to occupied cells in the surrounding area. In this context, dimensions of the cells are determined as a function of the position thereof relative to the course of the road.

This makes it possible to subdivide a predefined region into a reduced number of cells whose dimensions are selected in a way that combines information from fewer relevant parts of the surrounding area. This makes it possible to significantly reduce the computational outlay for a determination method based on the obstacle map. The use of the obstacle map can be altogether simplified. A more accurate time prediction of the movement of a movable obstacle can be made possible, for example. In particular, the movement of another road user along the course of a road can be predicted with improved accuracy.

In an example embodiment, the geometric shapes of the cells are determined as a function of the positions thereof relative to the course of the road. By using cells that are not necessarily square, but rather have the shape of a rectangle or a circular segment, the relevant information from the area surrounding the motor vehicle can be mapped onto the obstacle map with improved accuracy.

In an example embodiment, at least some of the cells have a main axis, the main axes of these cells being oriented as a function of the course of the road. Starting from the assumption that the motor vehicle moves along the road, the cells extend with the main axes thereof along the road, for example, so that redundant information does not take up too much memory capacity for the obstacle map.

In an example embodiment, the cell orientations are adapted to an elevation profile of the road. A distance between the motor vehicle and the obstacle, in particular a movable obstacle, can thereby be estimated with improved accuracy, since it is not the distance in the longitudinal or transversal direction of the motor vehicle that is estimated; rather, it is the actual distance along the course of the road. Projection errors may be thereby reduced.

The course of the road is preferably interpolated on the basis of a sequence of route points. The route points can be downloaded, for example, from a navigation system in which the course of the road is stored.

In an example embodiment, the dimensions of the cells increase with the distance from the motor vehicle in the direction of movement thereof Therefore, the closer a cell is to the motor vehicle in the direction of movement thereof, the smaller are the dimensions of the cell. Thus, the near field of the motor vehicle, which is especially relevant for a collision avoidance, can be described at a high resolution, while an area located further away can be represented at a lower resolution in the obstacle map.

According to an example embodiment of the present invention, a method for controlling a motor vehicle includes steps for creating an obstacle map using the method described above and for generating control signals for the motor vehicle on the basis of the obstacle map to avoid a collision between the motor vehicle and an obstacle. A functionality of this kind can be implemented as a driver assistance system, for example. In particular, it is possible to avoid a collision with an object in the area of the road.

A computer program product according to the present invention includes program code for implementing one of the described methods when the computer program product is executed on a processing device or is stored on a machine-readable storage medium.

According to an example embodiment of the present invention, a device for creating an obstacle map of an area surrounding a motor vehicle on a road includes a memory for storing a rasterized obstacle map; a scanning device for scanning an area surrounding the motor vehicle, the surrounding area being subdivided into cells; and a processing device for recording cells that are occupied by an obstacle and for identifying grid points of the obstacle map that correspond to occupied cells in the surrounding area, and for determining dimensions of the cells as a function of the position thereof relative to the course of the road.

In an example embodiment, the device is adapted for efficiently creating the obstacle map. In an example embodiment, the device additionally is adapted for evaluating the obstacle map, and, in an example, control signals are generated for influencing a trajectory of the motor vehicle. In an example embodiment, the processing device is also adapted for predicting the obstacle map for a future point in time. The control signals can then be generated on the basis of the predicted obstacle map.

The present invention is described in greater detail in the following with reference to the enclosed figures.

DETAILED DESCRIPTION

Figure 1:
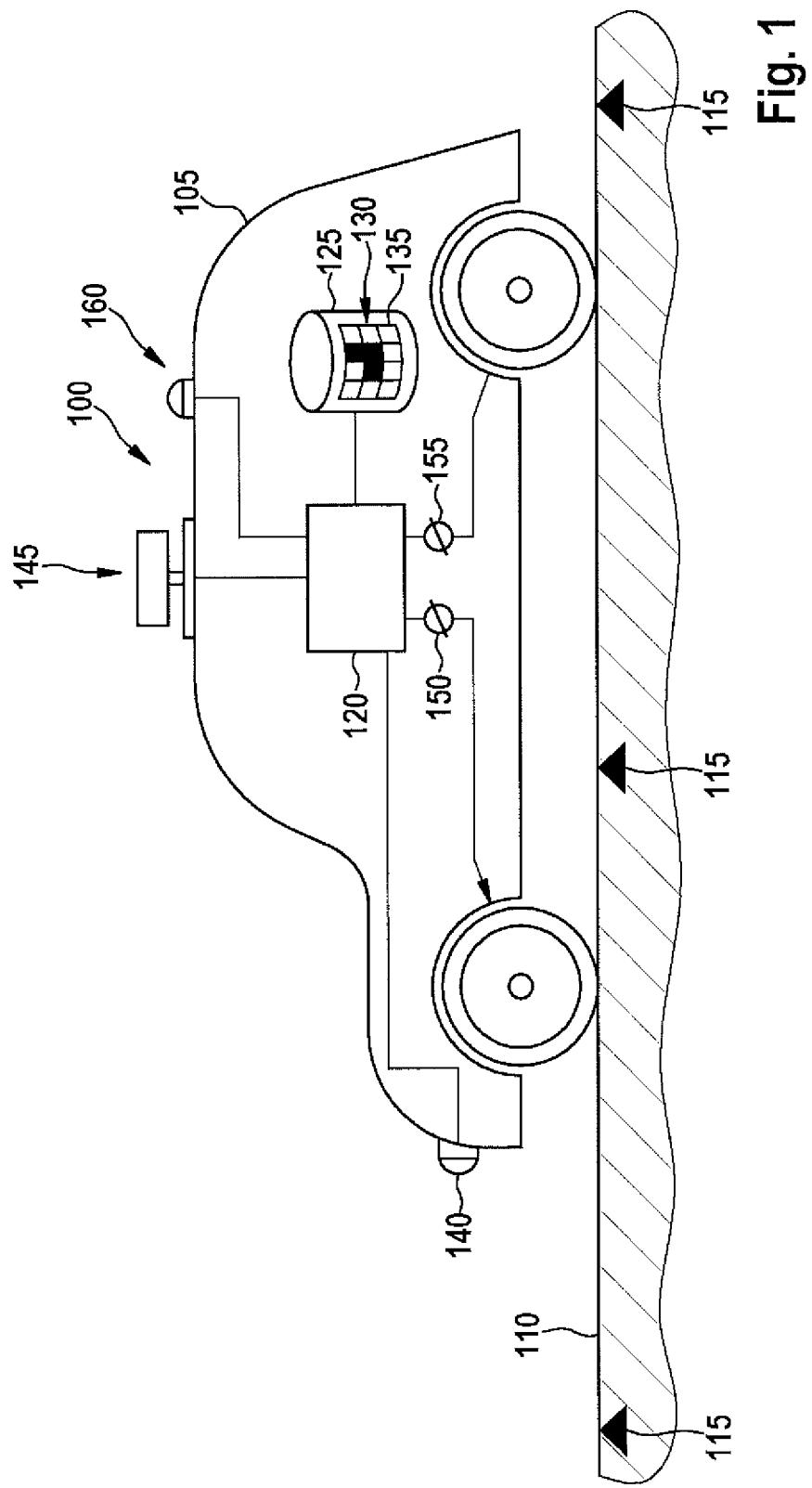
FIG. 1 illustrates a device on board a motor vehicle.

FIG. 1 shows a device 100 on board a motor vehicle 105. Motor vehicle 105 is located on a road 110, whose course is indicated in FIG. 1 by a number of route points 115. Each route point 115 includes a position and can additionally feature at least an elevation, an uphill grade or an orientation. If route points 115 include elevations, then a plurality of route points 115 include an elevation profile that can be used for more precisely determining the course of the road.

Device 100 includes a processing device 120 that is connected to a memory 125 and at least one sensor. Memory 125 is adapted for storing a representation of a rasterized obstacle map 130 that includes a number of grid points 135. Obstacle map 130 represents an area surrounding motor vehicle 105 in a way that makes it readily apparent which regions of the area surrounding motor vehicle 105 are occupied by an obstacle and which are not. Obstacle map 130 is typically organized in the form of a regular matrix, and each grid point 135 bears a binary datum.

In the representation of FIG. 1, processing device 120 is connected to a plurality of sensors, namely to a radar sensor 140 and a laser sensor 145. Additionally or alternatively, other sensors can be provided, for example a camera sensor or a LIDAR sensor. Sensors 140, 145 are adapted for scanning the area surrounding motor vehicle 105. On the basis of scanning by sensors 140, 145, processing device 120 determines where an obstacle is located in the area surrounding motor vehicle 105.

For this determination, processing device 120 subdivides the area surrounding motor vehicle 105 into cells, a grid point 135 of obstacle map 130 being assigned to each cell in memory 125. If a cell is occupied to a sufficient degree by an obstacle, processing device 125 identifies corresponding grid point 135 on obstacle map 130.

In an example embodiment, processing device 120 is also adapted for controlling motor vehicle 105 on the basis of obstacle map 130. To this end, processing device 120 is provided with a first interface 150 for influencing a directional control and/or a second interface 155 for influencing a velocity of motor vehicle 105. Processing device 120 can output signals via one of interfaces 150, 155 in order to avoid a collision of motor vehicle 105 with an obstacle in the surrounding area. In addition, to generate the signals for interfaces 150, 155, processing device 120 can also be adapted to predict obstacle map 130 for a future point in time, i.e., to predict the identifications of grid points 135 for a future point in time.

In an example, the area surrounding motor vehicle 105 is partitioned into cells in a way that makes the cell dimensions dependent upon the position thereof relative to the course of road 110. The partitioning of the surrounding area into cells is preferably implemented by processing device 120. In the process, the course of road 110 can be determined by processing device 120, for example on the basis of route points 115. Route points 115 can be downloaded from a map memory of a navigation system 160, for example. Alternatively or additionally, route points 115 can be determined on the basis of signals from sensors 140, 145.

Figure 2A:
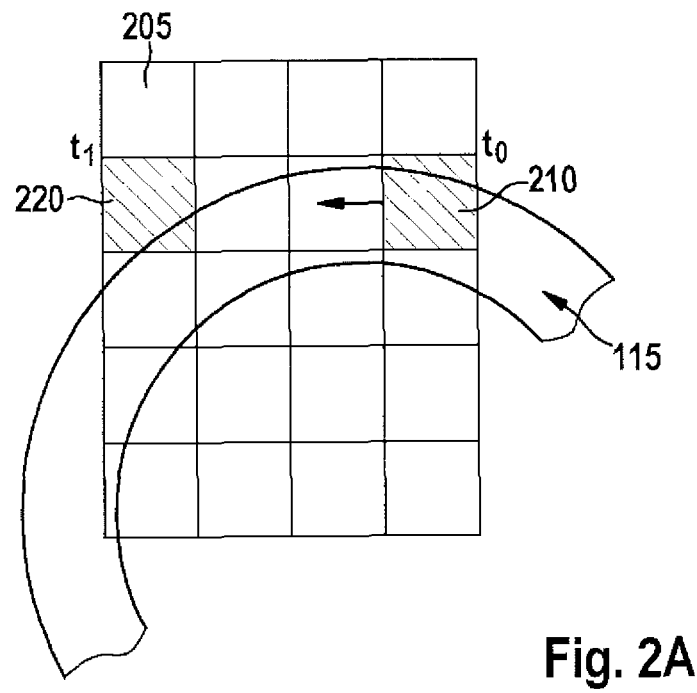
FIGS. 2A-2C show example subdivisions into cells of an area surrounding the motor vehicle from FIG. 1.
Figure 2B:
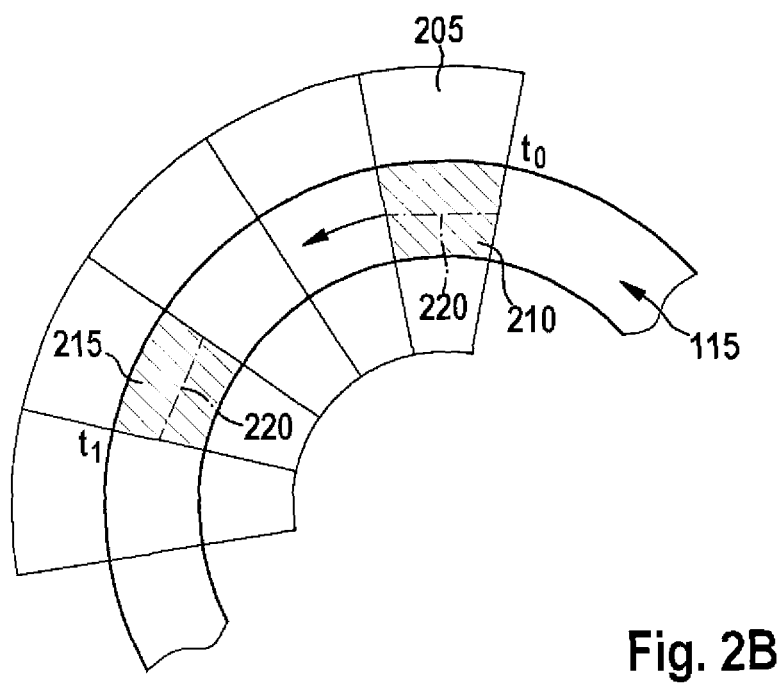
Figure 2C:
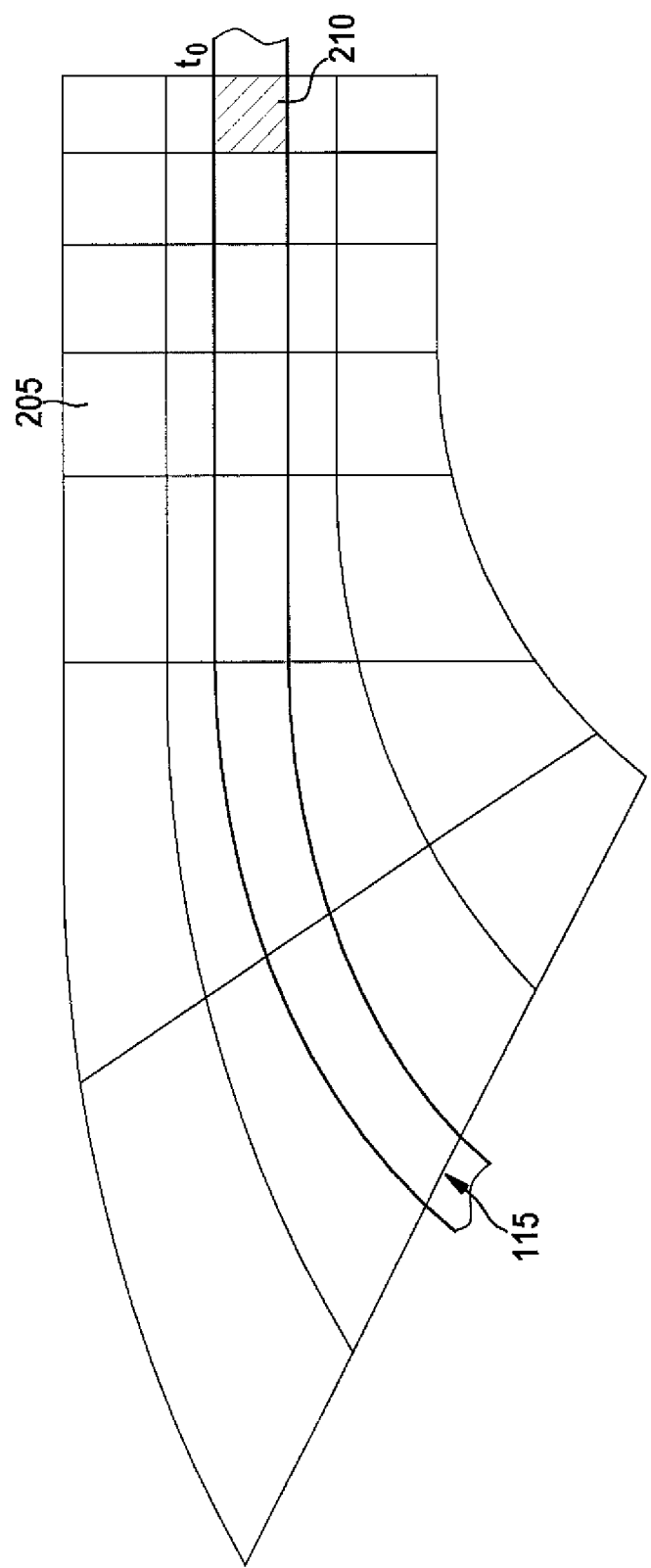

FIGS. 2A-2C show example subdivisions of the area surrounding motor vehicle 105 from FIG. 1 into cells 205. FIG. 2A shows a classic segmentation of the surrounding area into a regular array of square cells 205. An obstacle map 130 associated therewith usually features a corresponding structure, cells 205 being replaced by grid points 135.

A first cell 210 is partially located on road 110. At a first point in time $T_0$, an obstacle is located in first cell 210, which is why it is marked as occupied. The obstacle can include motor vehicle 105 or another road user, for example. On the basis of a direction and velocity of movement, it can be predicted for a later point in time $T_1$ that the obstacle will be advanced to a second cell 220 that is likewise marked as occupied in FIG. 2A. Only a small portion of second cell 220 is still located on road 110.

FIG. 2B shows another segmentation into cells 205 of the area surrounding motor vehicle 105 from FIG. 1. In the selected subdivision, dimensions of cells 205 are determined as a function of the particular position thereof relative to the course of road 110. In spite of the curve describing the same, the course of road 110 is subdivided into a linear series of mutually adjoining cells 205. Adjoining cells 205 on both sides of road 110 have shapes and dimensions that follow this division. The occupancy of second cell 220 at point in time $T_1$ is again determined on the basis of velocity and directional information about the obstacle in first cell 210 at point in time $T_0$. Since second cell 215 resides entirely on road 110, at point in time $T_1$, it reflects the current location of the obstacle that, at point in time $T_0$, resided in first cell 210, in the case that the obstacle is a vehicle that is following road 110.

By determining the dimensions of cells 205 as a function of the position thereof relative to the course of road 110, a simplified prediction of obstacle map 130 is made possible for a future point in time. Moreover, altogether fewer cells 205 can be defined in the area surrounding motor vehicle 105, since irrelevant regions can be omitted and not very relevant regions can be combined in relatively large cells 205, so that obstacle map 130 does not need to include as many grid points 135 in order to store enough relevant information.

For cells 210 and 215, principal axes 220 are also sketched in that each extends along the greatest extent of cells 210 and 215, respectively. In the illustrated example embodiment, principal axes 220 are oriented as a function of the course of road 115, principal axes 220 preferably extending in parallel to tangents to the course of road 115 in the area of particular cell 210, 215.

FIG. 2C shows another example segmentation into cells 205 of the area surrounding motor vehicle 105 from FIG. 1. Here, the extent of the cells is selected as a function of the distance thereof from motor vehicle 105 in first cell 210 along the course of road 110. The further a cell 205 is, along road 110, from motor vehicle 105, the greater are the dimensions thereof In the illustrated example embodiment, the dimensions of cells 205 also increase as a function of their distance transversely to road 110. This can facilitate the provision of additional space in memory 125 and possibly a processing outlay for predicting obstacle map 130 for a future point in time. This specific embodiment can be combined with others, in particular those shown in FIG. 2B.

Figure 3:
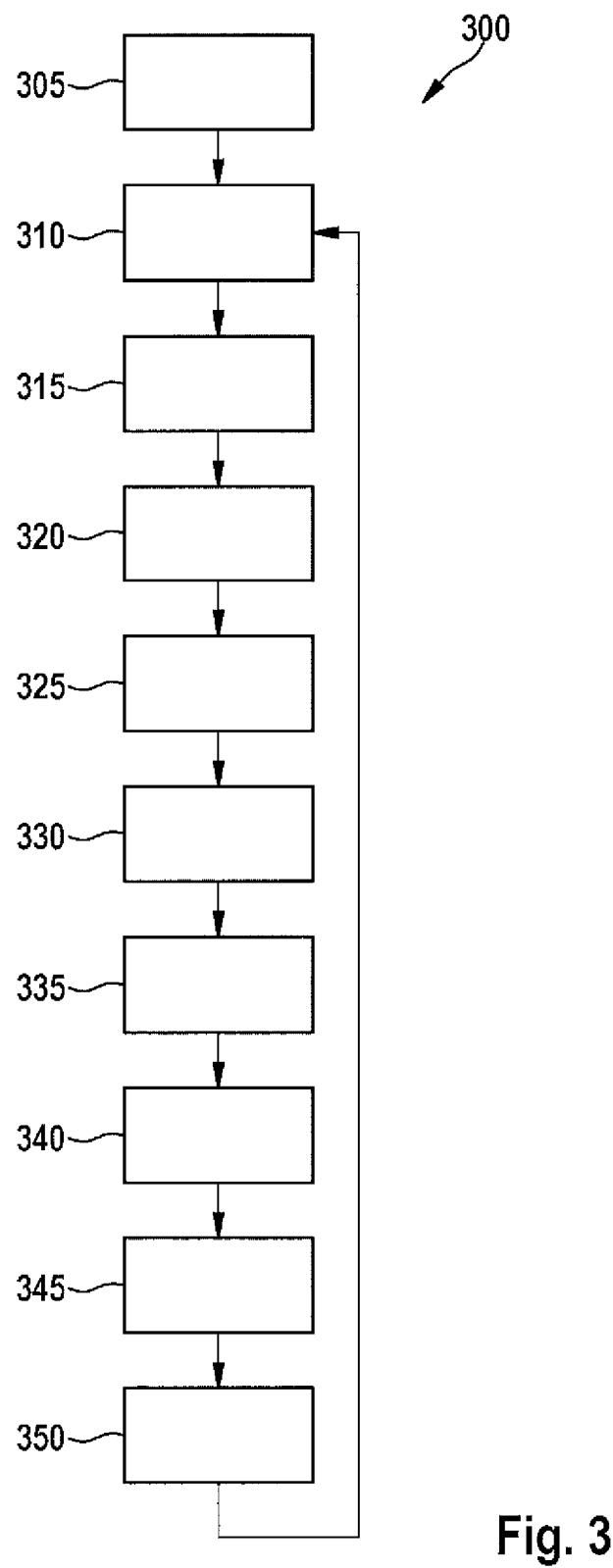
FIG. 3 is a flow chart that illustrates a method for controlling the motor vehicle from FIG. 1.

FIG. 3 shows a flow chart of a method 300 for controlling motor vehicle 105 from FIG. 1. Method 300 is divided into a first stage that includes steps 305 through 340, in which obstacle map 130 of the area surrounding motor vehicle 105 is determined, and a subsequent second stage that includes steps 345 and 350, in which motor vehicle 105 is controlled on the basis of particular obstacle map 130. In this context, the method of the first stage can also be executed without the steps of the second stage.

In a first step 305, obstacle map 130 is prepared in memory 125. In the process, the identification of all grid points 135 is typically removed. In a subsequent step 310, a route of motor vehicle 105 is optionally determined The route is stored, for example, in navigation system 160.

In a step 315, route points 115 are determined on the basis of map data of navigation system 160 or on the basis of sensor signals from sensors 140, 145. Defined route points 115 are interpolated in a subsequent step 320 in order to provide a course of road 110.

In a subsequent step 225, dimensions, shapes and orientations of cells into which the area surrounding motor vehicle 105 is subsequently divided are determined Dimensions of cells 205 are determined, in particular as a function of the position thereof relative to the course of road 110, as described above exemplarily with reference to FIGS. 2B and 2C.

In a subsequent step 330, the surrounding area is scanned by sensors 140, 145, in the case that this has not already taken place in the course of step 315. In a subsequent step 335, occupied cells 205 are recorded, and corresponding grid points 135 of obstacle map 130 are identified. Defined obstacle map 130 is then prepared in a step 340.

On the basis of prepared obstacle map 130, motor vehicle 150 can then be controlled, as indicated above. To that end, a desired behavior for motor vehicle 105 can then be recorded in a step 345. The desired behavior can include, for example, that motor vehicle 105 should move along road 110 and avoid a collision with all types of obstacles. In a subsequent step 350, the desired behavior can be converted into a target movement of motor vehicle 105 on the basis of obstacle map 130 prepared in step 340, and control signals can be specified for a directional or velocity control of motor vehicle 105. The specified signals can be output via interface 150 and/or 155.

The method can subsequently return to step 310 and be run through again, some of the steps having to be only partially, respectively incrementally implemented if the results of the previous loop are in large part unchanged.

What is claimed is:

1. A method for creating an obstacle map of an area surrounding a motor vehicle on a road, the method comprising:
    preparing, by processing circuitry, a rasterized obstacle map;
    obtaining, by the processing circuitry, a scan of an area surrounding the motor vehicle;
    dividing, by the processing circuitry, the scanned surrounding area into cells, respective dimensions of each of which are determined as a function of respective positions of the cells relative to a course of the road, wherein the dimensions of the cells are adapted to an elevation profile of the road;
    recording, by the processing circuitry, which of the cells are occupied by an obstacle; and
    identifying, by the processing circuitry, grid points of the rasterized obstacle map that correspond to the recorded occupied cells.

2. The method of claim 1, wherein the dividing includes determining respective geometric shapes of the cells as a function of the respective positions of the cells relative to the course of the road.

3. The method of claim 1, wherein a respective main axis of each of at least some of the cells is oriented as a function of the course of the road.

4. The method of claim 1, further comprising interpolating the course of the road is based on a sequence of route points downloaded from a map memory of a navigation system.

5. The method of claim 1, wherein sizes of the cells and dimensions of grid points increase as distance of the respective cells from the motor vehicle, in a direction of movement of the motor vehicle, increases.

6. A method for controlling a motor vehicle on a road, the method comprising:
    creating, by processing circuitry, an obstacle map of an area surrounding the motor vehicle by:
        preparing a rasterized obstacle map;
        obtaining a scan of an area surrounding the motor vehicle;
        dividing the scanned surrounding area into cells, respective dimensions of each of which are determined as a function of respective positions of the cells relative to a course of the road, wherein the dimensions of the cells are adapted to an elevation profile of the road;
        recording which of the cells are occupied by an obstacle; and
        identifying grid points of the rasterized obstacle map that correspond to the recorded occupied cells; and
    generating, by the processing circuitry, control signals for the motor vehicle based on the obstacle map to avoid a collision between the motor vehicle and an obstacle.

7. A non-transitory computer-readable medium on which is stored program code that is executable by a processing device and that, when executed by the processing device, causes the processing device to perform a method, the method comprising:
    creating an obstacle map of an area surrounding the motor vehicle by:
        preparing a rasterized obstacle map;
        obtaining a scan of an area surrounding the motor vehicle;
        dividing the scanned surrounding area into cells, respective dimensions of each of which are determined as a function of respective positions of the cells relative to a course of the road, wherein the dimensions of the cells are adapted to an elevation profile of the road;
        recording which of the cells are occupied by an obstacle; and identifying grid points of the rasterized obstacle map that correspond to the recorded occupied cells.

8. A device for creating an obstacle map of an area surrounding a motor vehicle on a road, the device comprising:
- a data storage configured for storing a rasterized obstacle map;
- a scanning device configured to scan an area surrounding the motor vehicle; and
- a processing device, wherein the processing device is configured to (a) divide the scanned surrounding area into cells, respective dimensions of each of which are determined as a function of respective positions of the cells relative to a course of the road, wherein the dimensions of the cells are adapted to an elevation profile of the road, (b) record which of the cells are occupied by an obstacle, and (c) identify grid points of the rasterized obstacle map that correspond to the recorded occupied cells.

* * * * *